United States Patent
Cody et al.

[11] 3,877,206
[45] Apr. 15, 1975

[54] MOWING MACHINE

[75] Inventors: John F. Cody; George W. Sites, both of Quincy, Fla.

[73] Assignees: Walter S. McNeilly; Gerald D. Bryant, both of Tallahassee, Fla. ; part interest to each

[22] Filed: Nov. 7, 1962

[21] Appl. No.: 236,108

[52] U.S. Cl............................... 56/12.8; 56/DIG. 3
[51] Int. Cl............................................ A01d 73/00
[58] Field of Search................ 56/25.4, 12.8, DIG. 3

[56] References Cited
UNITED STATES PATENTS

| | | | |
|---|---|---|---|
| 2,836,024 | 5/1958 | Davis et al. | 56/25.4 |
| 2,888,796 | 6/1959 | Denney | 56/25.4 |
| 2,898,723 | 6/1959 | Goodall | 56/25.4 |
| 3,050,146 | 8/1962 | Crim | 56/25.4 |
| 3,110,996 | 11/1963 | Dahlman | 56/25.4 |

*Primary Examiner*—Antonio F. Guida

[57] ABSTRACT

A lawn mower having a cutting blade on the end of a drive shaft and an air impeller blade intermediate the ends of the shaft and housed in a housing, the air impeller drawing air through the central portion of the housing and directing it downwardly so as to lift the lawn mower away from the ground as the cutting blade cuts the grass.

14 Claims, 4 Drawing Figures

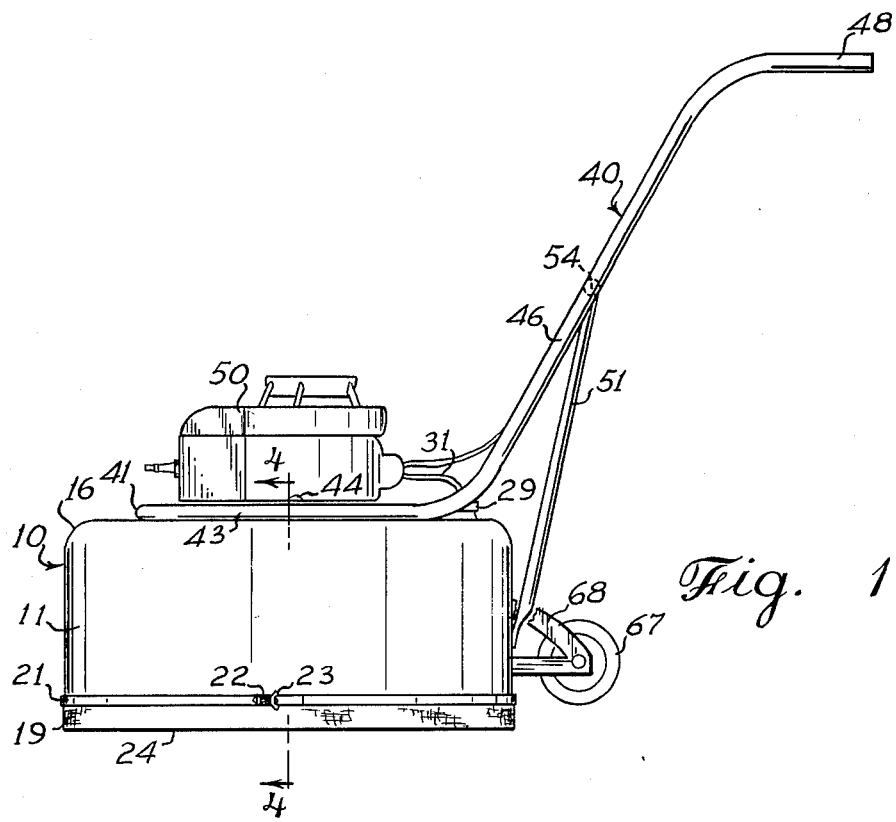
Fig. 1
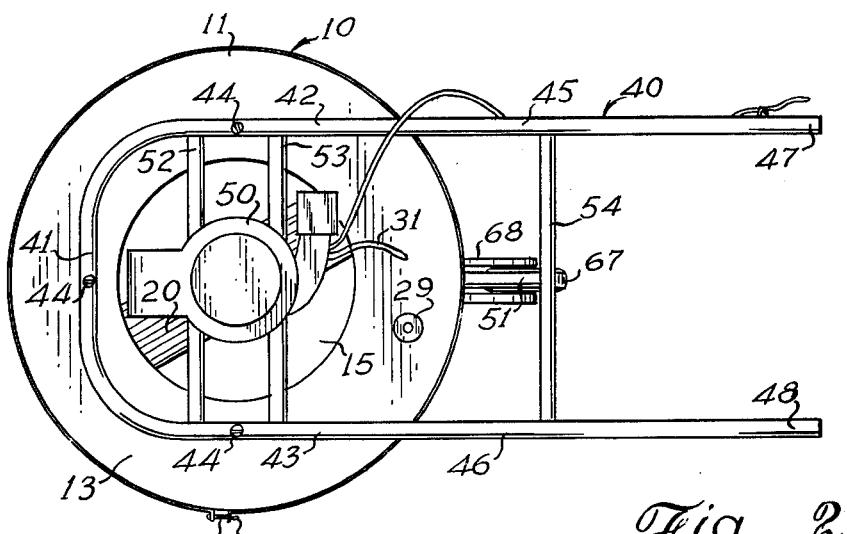
Fig. 2
INVENTORS.
John F. Cody
George W. Sites
BY
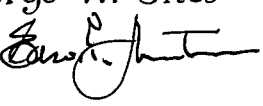
ATTORNEY INVENTORS.
John F. Cody
George W. Sites
BY

ATTORNEY

MOWING MACHINE

This invention relates to a mowing machine and is more particularly concerned with a rotary mower which is supported at a proper distance above the ground by a cushion of air.

In the past, power lawn mowers of the type having rotary blades have been widely accepted and used. Such prior art mowers have been supported on wheels which define the position of the blade above the ground. A change in height of a blade on a lawn mower has usually involved the raising or lowering of the wheels which support the housing of the mower or raising or lowering the blade itself. This is time consuming.

Either the power lawn mower described above is manually pushed across the surface of the lawn or it is power driven. A power driven lawn mower usually has a drive connected between the engine which drives the blade and one or a plurality of the wheels, there being provided a clutch mechanism between the engine and the wheel or wheels by which the wheel or wheels may be engaged and disengaged.

The power driven lawn mowers, while cutting the grass satisfactorily, are not too successful in their self propelled operation. For example, if the power wheel or wheels do not engage the ground firmly, the lawn mower will not be propelled thereover. Thus, on irregular ground, the mower must be manually pushed periodically. Likewise, when the mower is cutting fresh grass, the severed grass tends to stick to the mower wheels to decrease the traction of the wheels.

The conventional power driven mower also has the disadvantage of the wheels digging into the ground when wet, soft or freshly cultivated ground is encountered, thereby leaving long unsightly furrows which become essentially permanent when the ground becomes firm.

Usually, on the conventional lawn mower, wheels are mounted so that the mower may be propelled along a longitudinal path but cannot be readily turned without first lifting the front wheels. When sharp turns are made, the wheels tend to dig into the ground and thereby leave scars in the lawn.

Efforts have been made to eliminate the wheels from the lawn mower by substituting therefor skids on the housing or on the rotating blade. Lawn mowers having these skids have not been well accepted since such skids tend to pack down the grass.

While vehicles such as automobiles have, in the past, been supported on cushions of air, it would normally be expected that, if such support were applied to lawn mowers, the blast of air downwardly would flatten the grass and thereby prevent the lawn mower from functioning properly.

Briefly, the present invention which overcomes the disadvantages described above includes a housing defining a hollow, cylindrical, open ended tubular member within which, on a common shaft, are a blade and an impeller or propeller. The common shaft is driven by a gasoline engine mounted above the hollow portion of the housing so as to be in the path of travel of the air drawn into the housing by the propeller. Thence, the air is directed downwardly and outwardly on all sides of the housing so as to create the cushion of air which supports the mowing machine. A sleeve or skirt of relatively impervious flexible material adjustably surrounds the lower end of the housing to define the mean heights above the ground that the blade is suspended, while the height may be further regulated to a certain extent through the control of the speed of the engine. The housing is also provided with suitable baffles which tend to counteract the swirling motion imparted to the air by the propeller while other baffles are employed so as to control the blades of grass to position the grass in a generally upright condition for the cutting action of the blade.

A handle connected to the housing permits the housing to be tilted in one direction or the other so as to cause the spilling of air to a greater extent in one direction. This spilling of air imparts movement to the housing in the direction of tilt.

Accordingly, it is an object of the present invention to provide a mowing machine which is supported on a cushion of air and has no elements which normally engage the ground during its cutting operation.

Another object of the present invention is to provide a mowing machine which may be propelled over the ground in any selected direction, the direction of travel and the rate of travel being controlled by the operator through tilting of the mowing machine.

Another object of the present invention is to provide a mowing machine which is inexpensive to manufacture, durable in structure and efficient in operation.

Another object of the present invention is to provide a mowing machine which has few moving parts to get out of adjustment and is well suited to the demands of economical mass production.

Another object of the present invention is to provide a mowing machine in which the height of the cutting blade above the surface to be mowed may be readily and easily varied.

Another object of the present invention is to provide a mowing machine which is lightweight and rugged in construction and has provided a long, trouble free, useful life.

Another object of the present invention is to provide a power mower in which the gasoline tank is an integral part of the housing.

Another object of the present invention is to provide a mowing machine which will ride smoothly over the vegetation to be mowed, regardless of minor variations in the contour of ground thereunder, to provide a smooth uniform height cutting operation.

Other and further objects, features and advantages will become apparent from the following description when taken in conjunction with the accompanying drawing wherein like characters of reference designate corresponding parts throughout the several views, and wherein:

FIG. 1 is a side elevational view of a mowing machine constructed in accordance with the present invention.

FIG. 2 is a plan view of the mowing machine disclosed in FIG. 1.

Figure 3:
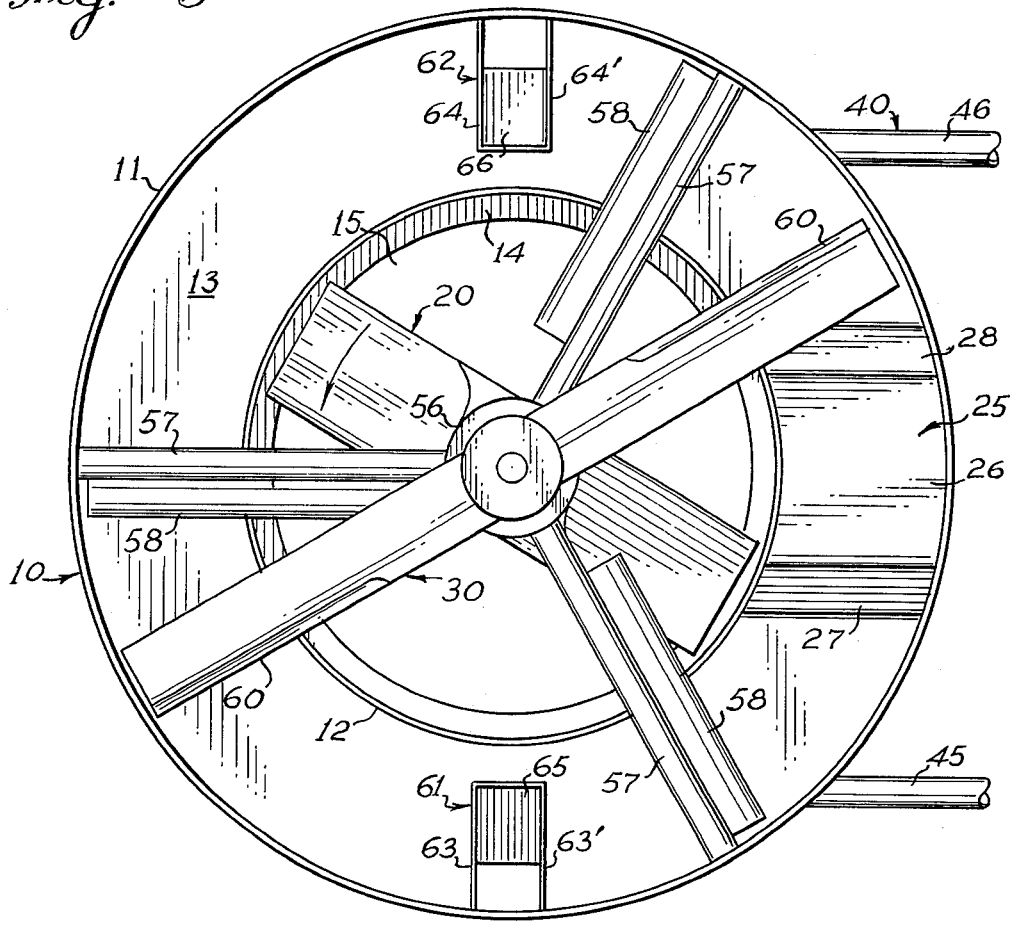
FIG. 3 is an enlarged fragmentary bottom plan view of the mowing machine illustrated in FIG. 1.

Referring now in detail to the embodiment chosen for the purpose of illustrating the present invention, it being understood that in its broader aspects the present invention is not limited to the exact details herein depicted, numeral 10 denotes generally the housing of the rotary mower or mowing machine within which is the impeller or propeller 20 and the blade 30. A handle assembly 40 connected to the housing 10 permits control of the mowing machine by the operator, while a gasoline engine 50 is the prime mover which rotates the blade 30 and the propeller 20 simultaneously.

In more detail, the housing 10 is preferably formed from fibre glass reinforced polyester; however, it will readily be understood that metal, for example aluminum, steel, or magnesium alloy may be substituted therefor and that other plastics and reinforced plastics are suitable for materials of construction for the housing. The housing 10 is a hollow tubular or cylindrical member open at both its top and bottom to provide for the ingress and egress of air. Housing 10 includes an annular right cylindrical outer housing body 11 defining a cylindrical chamber open at its bottom and an inner annular right cylindrical propeller cowling or housing body 12. The upper edges of outer body 11 and inner body 12 are integrally joined by a web or top 13 which protrudes inwardly beyond the edge of body 12 to define an annular shoulder 14 having a circular top opening 15 for the ingress of air into housing 10. The junction of the top 13 and the outer housing body 11 is rounded as at numeral 16 to provide a pleasing appearance and an object having no sharp edges which may injure the operator.

It will be seen that the two bodies 11 and 12 are concentric with each other and have upper edges which terminate in substantially a common transverse plane containing the top 13. The bottom edge 17 of the inner housing body 12, however, terminates in the upper central portion of the area defined by outer housing body 11. In other words, the bottom edge 17 terminates in a transverse plane parallel and below the top 13, the transverse plane of edge 17 being above the medial transverse plane of the outer housing body 11. The bottom edge 18 of outer housing body 11 terminates in a transverse plane parallel to top 13 and well below the plane of edge 17.

Surrounding the edge 18 is an annular skirt 19 retained in place overlapping outside surface of body 11 by a metal strap or keeper ring 21. Strap 21, as seen in FIG. 1, has a bolt 22 joining its ends, the bolt 22 being provided with external threads which threadedly receive a wing nut 23 thereon. By loosening nut 23, the strap 21 may be manipulated to adjust the distance which the skirt 19 protrudes below the edge 18 of body 11.

It will be understood that while the skirt 19 is preferably formed from a woven polyethylene such as is commonly used as tape for lawn furniture, other materials which are flexible and tough and are impervious to air to the extent sufficient to create back pressure for lifting the lawn mower are suitable. Such materials do not necessarily have to confine a major portion of the air, if the circulation of air is sufficient to straighten out the skirt and permit a spillage of air below the bottom edge 24 of the skirt 19.

While the flexible skirt 19 materially improves the performance of the lawn mower, the lawn mower is nevertheless operative without the skirt 19 and it will be understood that even a metal skirt 19 could be used; however, such a metal skirt is not recommended for best results.

The housing 10 also includes a gasoline tank 25 seen in FIG. 3 molded into the housing 10, between the inner housing body 12 and the outer housing body 11.

The tank 25, within the upper portion of the chamber of housing body 11, includes a bottom 26 extending between the lower edge 17 of inner housing 12 and an intermediate portion of outer housing 11. The sides 27 and 28 extend from opposite sides of bottom 26 and diverge upward to terminate at top 13. Thus, the closure of tank 25 is defined by the opposed portions of housing bodies 11 and 12, the opposed sides 27 and 28 and the opposed bottom 26 and the portion of top 13. A cap 29, seen in FIG. 2, permits the tank 25 to be filled while a syphon tube 31, which projects through top 13 to terminate a short distance from the bottom 25, is provided for the gasoline to be withdrawn from the tank 25. The tube 31 is connected to engine 50 in the usual way.

Mounted on the top 13 is the base of the handle assembly 40. The base of handle assembly 40 is a U-shaped member formed from tubular metal such as aluminum and including a cross bar 41 at the forward end of the handle assembly and a pair of arms 42 and 43 projecting rearwardly from the ends of cross bar 41, the arms 42 and 43 extending respectively parallel to each other on opposite sides of opening 15. The cross bar 41 and arms 42 and 43 are so dimensioned as to surround 270° of the circular opening 15, arms 42 and 43 extending on opposite sides of tank 25. Bolts 44 secure the arms 42 and 43 to the upper surface of top 13.

From the rear ends of arms 42 and 43 the parallel legs 45 and 46 of the handle assembly extend upwardly and rearwardly, as illustrated in FIGS. 1 and 2, the legs 45 and 46 being bent rearwardly to form spaced parallel handles 47 and 48.

Intermediate the ends of legs 45 and 46 is a cross bar 54, from the central portion of which extends a reinforcing bar 51 which is connected by its end to the side of annular housing body 11.

A pair of parallel motor mounting bars 52 and 53 extends between intermediate portions of arms 42 and 43 so as to pass on opposite sides of the vertical center line or vertical axis of housing 10. The motor or engine 50, which in the present embodiment is an internal combustion gasoline engine, is supported by bars 52 and 53. Any other suitable electric motor or other type of prime mover may be employed in place of engine 50 if desired. The engine 50 is provided with a downwardly extending drive shaft 55 which protrudes along the centerline or vertical axis of housing 10 through a bearing 56 to terminate therebelow.

The bearing 56 forms the hub of a spider mounted within the lower portion of the chamber of housing body 11, the spider having three radially extending evenly spaced arms 57 which are connected by their outer ends to the inside surfaces of housing body 11. On each arm 57 is a primary fin, vane or baffle 58 which is curved upwardly and in a counterclockwise direction as viewed in FIG. 4. The blade 30 is mounted on the end of shaft 55 below bearing 56 and within the bottom of the chamber of housing body 11 by means of a bolt 59 which threadedly protrudes into the end of shaft 55. A friction washer between the bolt 59 and blade 30 aids bolt 59 in retaining the blade 30 in place. Blade 30 extends diametrically across the housing body 11 terminating slightly inwardly of the body 11 and is essentially a conventional blade for rotary lawn mowers. In the present embodiment, the blade 30 is illustrated as a rectangular member secured by its central portion to shaft 55. The cutting edges 60 of blade 30 are sharpened over a greater length than a conventional blade for purposes to be described hereinafter.

Figure 4:
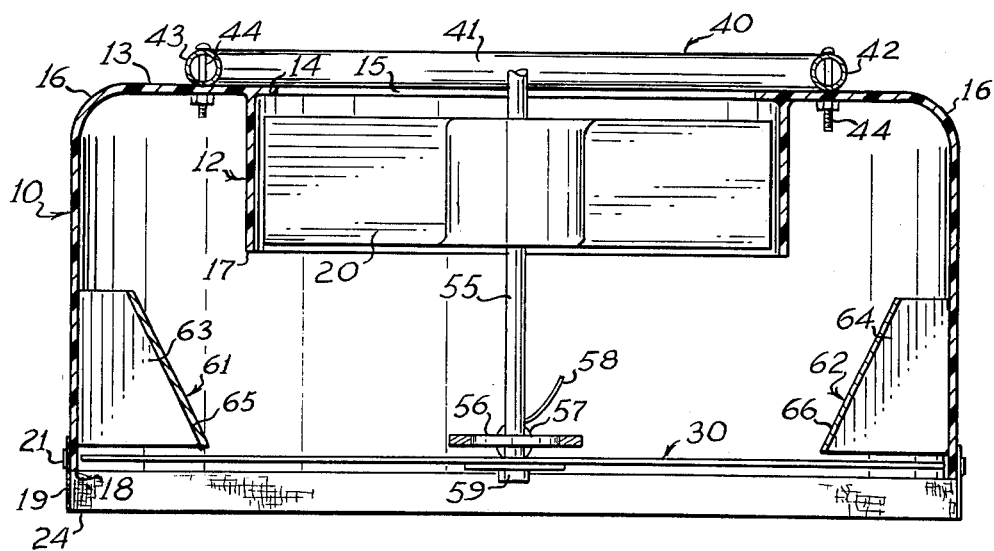
FIG. 4 is an enlarged fragmentary cross sectional view taken substantially along line 4—4 in FIG. 1 and in which parts of the machine are deleted for the purpose of clarity.

It will be observed in FIG. 4 that the blade 30 is disposed in a transverse plane normal to the axis of shaft 55 and slightly above or inwardly of the plane of the edge 18. Hence when the housing 10 is resting on a flat surface, the blade 30 is spaced inwardly of this flat surface and is free to rotate while the housing rests on edge 18.

For creating a downward blast of air, i.e., to produce a positive pressure within housing 10, the impeller or propeller 20 is mounted on shaft 55 for rotation therewith. The propeller is, however, positioned above blade 30 and bearing 56 within the housing 10 and more specifically within the confines of its cowling or inner housing body 12 immediately below the plane of the top 13. The propeller 30 and blade 20 are therefore fixed on a common shaft 55 and are simultaneously rotated in the same direction upon rotation of shaft 55 by the motor or engine 50.

Below the propeller 20 and immediately above blade 20 for projecting above the path of travel of the tips of blade 30 are a pair of opposed secondary baffles 61 and 62 which protrude within the chamber from opposite inner sides of the outer housing body 11, as best seen in FIGS. 3 and 4. The purpose of these baffles is to cause the grass on the extreme sides of the path of travel of the lawn mower to stand upright so that they may be cut by blade 30. The baffles 61, 62 are complementary to each other, having essentially radially inwardly extending pairs of parallel sides 63, 63' and 64, 64', respectively. The inner ends of sides 63, 63' support an inwardly and downwardly directed baffle plate 65 while the sides 64, 64' support a similar baffle plate 66. Thus, a hollow portion having a small opening at its top and a large opening at its bottom is provided.

The lower edges of baffles 61, 62 terminate in a common transverse plane immediately above blade 30 as seen in FIG. 4.

If desired, a transportation wheel 67 is provided on a bracket 68 extending rearwardly from the back of housing 10. By tilting the mower rearwardly, the weight of the mower may be carried on wheel 67. The wheel 67, however, is sufficiently high that it does not touch the ground when the mower is flat thereon.

OPERATION

From the foregoing description, the operation of the present rotary mower should be apparent. When the rotary mower here disclosed is in its normal position, it rests upon the edge 18; and, the skirt 19, being flexible, is collapsed thereunder or adjacent the edge 18. Hence a closed chamber defined by the surface on which the mower rests and the housing 10, except for the upper opening 15, is provided. When the engine 50 is started, it rotates shaft 55, the propeller 20 and blade 30 in a counterclockwise direction as viewed in FIG. 3. Air is therefore drawn in through opening 15 and directed downwardly by propeller 20, the cowling or inner housing body 12 confining the air so that a positive pressure is created in the chamber of the outer housing 11. The compressed air thus created is directed against the ground or other surface on which the mower rests and tends to lift the mower upwardly. As the housing 10 is lifted, the lower portion of the skirt 19 below edge 18 is straightened and thereby becomes the effective bottom of the chamber, around which the air now passes to the atmosphere. A cushion of air is therefore created on which the housing 10 rests or rides a short distance above the ground. The mower is relatively stable at this short distance above the ground since any raising of the housing 10 will increase the annular opening between the ground and the skirt 19, thereby venting any compressed air to the atmosphere and decreasing the pressure within the chamber of housing 10, while any decrease in the annular opening will increase the pressure in the chamber of housing 10.

While the exact path of the air, its circulation in the chamber of housing 10 and the effect on the grass or other vegetation is not completely understood by us, it may be theorized from our observations of the machine in operation that since the tips of the blades of propeller 20 are travelling at a greater speed than the other portions thereof, the greatest velocity of air is created along the periphery of the propeller 20 adjacent cowling 11 while little or essentially no downward movement of the air is created adjacent the hub of propeller 20, i.e., at shaft 55. This creates a downwardly directed vortex which may include a partial vacuum in its central portion. This vortex of course is rotating in the direction of rotation of propeller 20. As the swirling air moves downwardly, it engages the baffles 58 which tend to straighten out the path of the air and, indeed, direct a portion of the air in a clockwise direction to counteract the torque created by the engine and the vortex. The air, thence, moves outwardly in all directions to pass between the lower edge 18 of the housing body 11 and the ground to lift the housing 10 off of the ground by a short distance. In directing the air downwardly, the baffles 58 also create a vacuum along their back surfaces. Thus, the vacuum of the vortex and of the baffles 58 tends to lift the grass or vegetation which has been blown flat by the air blast across edge 24. When the grass or vegetation is lifted, it is cut by blade 30 in the usual manner; however, the cutting action may take place inwardly of the tips of blade 30, thereby suggesting that the cutting edges 60 be sharpened over a greater length than conventional blades.

The grass or vegetation at extreme opposite edges of the path of travel of the mower is never below the central portion of the mower, and hence it is believed that this marginal grass is never subject to any appreciable vacuum thus far described. It is believed that the secondary baffles 61 and 62 serve to block the flow of air momentarily against the marginal grass and may also create vacuums along the trailing surfaces of sides 63, 63', 64, 64' and particularly along the trailing surfaces of sides 63' and 64. Hence the marginal grass is given an opportunity to stand upright and indeed may be sucked upwardly to be cut.

To propel the mower in any given direction, the mower is simply tilted in that direction. The tilting is accomplished by manipulation of the handles 47 and 48 which in effect serve as a means for regulating the direction of flow of the air. In other words, the tilting of handles 47 and 48 causes more air to be spilled from the portion of the edge 24 of skirt 19 opposite the intended direction of travel. This increased flow causes a reaction because of the pressure differential to propel the mower in the selected direction. Sidewise movement is as easy to attain as forward and rearward movement.

When the mowing operation is completed, the engine 50 is shut off and the mower again rests on edge 18. It may readily be transported, as above described, by tilting it rearwardly so as to support the housing by the transportation wheel 67.

When it is desired to vary the cutting height of the blade 30, the skirt 19 is simply adjusted by loosening of the nut 23 so that the skirt may be physically moved. To lower the effective cutting position of blade 30 the skirt 19 is raised while to raise the effective cutting portion of blade 30, the skirt is lowered. Changes in speed of the motor or engine 50 may also affect a change in cutting height; however, this is minor.

It will be obvious to those skilled in the art that many variations may be made in the embodiment chosen for the purpose of illustrating the present invention without departing from the scope thereof as defined by the appended claims.

We claim:

1. In a mowing machine of the class wherein a housing carries a prime mover which drives a blade in a predetermined path of travel for engaging vegetation to be severed from the ground, the combination therewith of means for directing air against the ground to support said housing above the ground, and means for shielding a portion of the path of travel of the blade from flow of the air.

2. In a mowing machine of the class having a housing, a prime mover mounted on said housing and a cutting blade driven in a predetermined path of travel by said prime mover for engaging and cutting vegetation below said housing, the combination wherein said housing is an upright hollow tubular member provided with a first opening adjacent the ground and a second opening, am impeller mounted with said housing and driven by said prime mover for drawing air into said housing from said second opening and for directing said air downwardly through the hollow portion of said housing and out of said first opening between said housing and the ground for supporting said housing off the ground over which said mowing machine is to be moved and means for shielding a portion of the path of travel of said blade from the downwardly directed air.

3. A mowing machine comprising a housing body having an upper edge and a bottom edge defining a chamber therebetween, the chamber being open at its bottom portion, a top across the upper edge of said housing body, said top defining an upper opening for the ingress of air into said chamber, a shaft extending through said upper opening into said chamber, a prime mover mounted on said top for driving said shaft, a propeller carried by said shaft adjacent said opening for rotation with said shaft, said propeller driving air into said chamber upon rotation of said shaft, a blade on the lower end of said shaft, said blade being disposed in a transverse plane normal to the axis of said shaft and adjacent the lower edge of said housing body, and means for controlling the tilting of said housing body.

4. A mowing machine comprising a housing body defining a chamber therewithin, the chamber being open at its bottom portion, a cowling mounted in the upper portion of said housing body, a top extending between said housing body and said cowling for closing the area therebetween; said cowling defining an upper opening for the ingress of air into said chamber, a shaft protruding through said housing body, a prime mover mounted on said housing body for driving said shaft, a propeller within said cowling and driven by said prime mover, and a blade at the lower end of said shaft, said blade being disposed adjacent the lower edge of said outer housing, a handle assembly fixed to said housing body, said assembly including means for controlling said housing body.

5. A mowing machine comprising a hollow housing, said housing including an annular housing body having an upper edge and a bottom edge defining a chamber therebetween, the chamber being open at its bottom portion, an annular cowling mounted concentrically in the upper portion of said housing body, and a top extending between said housing body and said cowling, said cowling defining an upper opening for the ingress of air into said chamber, a shaft in said housing, a prime mover mounted on said housing for driving said shaft, a propeller carried by said shaft within said cowling for rotation with said shaft when said shaft is driven by said prime mover, and baffles within said chamber for reducing the swirling motion imparted to the air by said propeller.

6. A mowing machine comprising a hollow housing, said housing including an annular housing body having an upper edge and a bottom edge defining a chamber between, the chamber being open at its bottom portion, an annular cowling mounted concentrically in the upper portion of said housing body, and a top extending between the upper edge of said housing body and the upper edge of said cowling, said cowling defining an upper opening for the ingress of air into said chamber, a shaft mounted along the common axis of said housing body and said cowling, a prime mover mounted on said top over said upper opening and driving the upper end of said shaft, a propeller carried by said shaft within said cowling for rotation with said shaft when said shaft is driven by said prime mover, a spider connected to said housing body and carried thereby within the lower portion of said chamber, said spider having a bearing for journalling said shaft intermediate the ends of said shaft, and a blade on the lower end of said shaft, said blade being disposed below said spider in a transverse plane normal to the axis of said shaft and above the lower edge of said housing body.

7. A mowing machine comprising a hollow housing, said housing including an annular housing body having an upper edge and bottom edge defining a chamber therebetween, the chamber being open at its bottom portion, an annular cowling mounted concentrically in the upper portion of said housing body, a top extending between the upper edge of said housing body and the upper edge of said cowling, said cowling defining an upper opening for the ingress of air into said chamber, a shaft mounted along the common axis of said housing body and said cowling, a prime mover mounted on said top over said upper opening and driving the upper end of said shaft, a propeller carried by said shaft within said cowling for rotation with said shaft when said shaft is driven by said prime mover, a spider connected to said housing body and carried thereby within the lower portion of said chamber, said spider having a bearing for journalling said shaft intermediate the ends of said shaft, a blade on the lower end of said shaft, said blade being disposed below said spider in a transverse plane normal to the axis of said shaft and above the lower edge of said housing body, a handle assembly fixed to said housing, said handle assembly including a pair of handles for guiding said housing, a plurality of primary baffle means within said chamber for reducing the swirling motion imparted to the air by said propeller, and secondary baffle means on opposite sides of said housing body and projecting into said chamber immediately above the path of travel of the tips of said blade.

8. A mowing machine comprising a hollow housing, said housing including an annular housing body having an upper edge and bottom edge defining a chamber therebetween, the chamber being open at its bottom portion, an annular cowling mounted concentrically in the upper portion of said housing body, a top extending between the upper edge of said housing body and the upper edge of said cowling, said cowling defining an upper opening for the ingress of air into said chamber, a shaft mounted along the common axis of said housing body and said cowling, a prime mover, a propeller carried by said shaft within said cowling for rotation with said shaft when said shaft is driven by said prime mover, a spider connected to said housing body and carried thereby within the lower portion of said chamber, said spider having a bearing for journalling said shaft intermediate the ends of said shaft, a blade on the lower end of said shaft, said blade being disposed below said spider in a transverse plane normal to the axis of said shaft and above the lower edge of said outer housing body, a tubular metal handle assembly fixed to said top, said tubular metal handle assembly including a cross bar at the forward end of said handle assembly, a pair of rearwardly extending arms connected respectively to the ends of said cross bar, a pair of upwardly and rearwardly extending legs connected respectively to said legs, said cross bar and said arms defining a base secured to the upper surface of said top, a pair of additional cross bars extending between said arms and across said opening, said additional cross bars supporting said prime mover, a plurality of primary baffles carried by said spider within said chamber for reducing the swirling motion imparted to the air by said propeller, a pair of secondary baffles on opposite sides of said housing body and projecting into said chamber immediately above the path of travel of the tips of said blade, a fuel tank within said housing, and means for supplying fuel from said fuel tank to said prime mover.

9. In a mowing machine of the type having a housing provided with a chamber and in which a vertical shaft rotates a cutting blade adjacent the lower open end of the housing, the combination therewith of a second blade mounted above said first blade on said shaft for rotation therewith, said second blade being of sufficient size and configuration to produce a blast of air downward sufficient to support said housing in a spaced position above the ground when said shaft is rotated at mowing speed, and baffle means mounted between said first blade and said second blade for shielding a portion of the path of travel of said first blade from the downward blast of air created by said second blade.

10. The structure defined in claim 9 wherein said baffle means includes baffles protruding inwardly from said housing toward said shaft between said first blade and said second blade.

11. The structure defined in claim 10 wherein said baffles are diametrically opposed and protrude from opposite sides of said housing transversely of the path of travel of the mowing machine.

12. A grass cutting machine comprising a housing having a bottom opening, the peripheral edge of which is located substantially in a plane, a rotary air impeller mounted on a shaft in said housing, a rotary cutter mounted in said housing below said air impeller on the same shaft, and driving means for said rotary air impeller and said rotary cutter, said air impeller being constructed to expel air through said bottom opening along paths and at rates suitable for slightly elevating said housing and parts carried thereby from the ground by ground effect.

13. A grass cutting machine comprising a hood having a top cover portion and a skirt portion, the latter being substantially shaped as a vertically disposed cylinder terminated at its bottom with a supporting rim, a motor attached to said top cover portion, said motor having a vertical shaft extending into the space within said skirt portion, an air impeller mounted on said shaft, a rotary cutter mounted on said shaft below said air impeller, and air inlet opening disposed centrally of said top cover portion, said air impeller being constructed to suck in air through said air inlet opening and to expel air through the open bottom of said hood at a rate sufficient to slightly elevate the assembly of said hood, motor, air impeller and rotary cutter from the ground by ground effect.

14. A wheelless grass cutting machine having a power operated rotary cutter and commonly driven air impelling means for producing ground effect to support said machine on a cushion of air at a distance above the ground.

* * * * *